(12) United States Patent
Tschanun

(10) Patent No.: US 6,373,048 B1
(45) Date of Patent: Apr. 16, 2002

(54) METHOD AND DEVICE FOR STABILIZING THE SCALE FACTOR OF A FIBER OPTIC GYROSCOPE

(75) Inventor: Wolfgang Tschanun, Ebringen (DE)

(73) Assignee: Litef GmbH (DE)

( * ) Notice: Subject to any disclaimer, the term of this patent is extended or adjusted under 35 U.S.C. 154(b) by 0 days.

(21) Appl. No.: 09/600,723
(22) PCT Filed: Jan. 18, 1999
(86) PCT No.: PCT/EP99/00267
  § 371 Date: Jul. 20, 2000
  § 102(e) Date: Jul. 20, 2000
(87) PCT Pub. No.: WO99/37975
  PCT Pub. Date: Jul. 29, 1999

(30) Foreign Application Priority Data

Jan. 21, 1998 (DE) .......................... 198 02 095

(51) Int. Cl.⁷ .............................................. G01C 18/72
(52) U.S. Cl. ................... 250/231.12; 356/450; 356/464
(58) Field of Search ........................ 250/231.12, 214, 250/205; 356/450, 464

(56) References Cited

U.S. PATENT DOCUMENTS 5,020,913 A * 6/1991 Okada et al. ............... 356/350
5,698,784 A * 12/1997 Hotelling et al. ........ 73/504.16
5,781,296 A * 7/1998 Yamamoto et al. ......... 356/350
5,801,377 A * 9/1998 Karpinski, Jr. et al. . 250/231.12
5,946,097 A * 8/1999 Sanders et al. ............. 356/350

FOREIGN PATENT DOCUMENTS

| | | |
|---|---|---|
| CA | 1289787 | 10/1991 |
| DE | 3148925 | 6/1983 |
| DE | 3429592 | 2/1985 |
| EP | 0652417 | 5/1995 |
| FR | 2590035 | 5/1987 |
| GB | 2157425 | 10/1985 |
| JP | 08304084 | 11/1996 |

* cited by examiner

Primary Examiner—Robert H. Kim
Assistant Examiner—Irakli Kiknadze
(74) Attorney, Agent, or Firm—Elliott N. Kramsky

(57) ABSTRACT

A method and apparatus for stabilizing the scale factor of a fiber optic gyroscope in which a superluminescence diode or broadband multimode laser comprises the light source. The emission bandwidth injected into a fiber end from the light source is limited to a considerably narrower transmission bandwidth within the wavelength band of the intensity characteristic of the light by a narrowband optical filter. The temperature at the filter is measured, and the transmission bandwidth quickly corrected by means of a pre-calibrated look-up table when optical interference filters are employed. The readjusted wavelength value is used for scale factor calculations.

12 Claims, 2 Drawing Sheets

METHOD AND DEVICE FOR STABILIZING THE SCALE FACTOR OF A FIBER OPTIC GYROSCOPE

BACKGROUND

1. Field of the Invention

The present invention relates to methods and apparatus for stabilization of scale factor in a fiber optic gyroscope ("FOG"). More particularly, the invention is directed to fiber optic gyroscopes equipped with a broadband light source, such as a superluminescent diode ("SLD") or a multimode laser.

2. Description of the Prior Art

Broadband SLDs are often employed in relatively new fiber optic gyroscopes without bandwidth limitation. It has been found, in existing SLDs, that aging effects and instantaneous operating temperature fluctuations lead to significant scale factor fluctuations, unacceptable for high precision gyros.

Past attempts have been made to counter the fluctuation problem by measuring temperature at the FOG sensor block and the light source to correct wavelength-dependent error. Relatively-complex models have led to reduction of the wavelength uncertainty, but fail to provide active compensation. Instantaneously detected temperature-dependent wavelength fluctuation magnitudes are on the order of 300 nm/degrees C. magnitude. The aging effect depends primarily upon production processes.

GB 2 157 425 A teaches scale factor stabilization in a fiber optic gyroscope incorporating a temperature compensation apparatus for adjusting the laser radiation wavelength to minimize the temperature coefficient of scale factor. As a result, the data emitted from the gyro are not influenced by changes in the temperature of the fiber.

JP 08304084 A teaches an electronic signal processing circuit for correcting the scale factor error of an optical gyroscope. To accomplish this, wavelength change is detected by measuring polarization level change. The polarization level of the light passing through the birefringent optical fiber varies as the wavelength of the light source varies in response to temperature changes.

DE 34 29 592 A1 discloses a fiber optic gyroscope including a temperature compensation device. The arrangement insures that the wound fiber has a thermal coefficient of expansion having a value approximately equal to the refractive-index coefficient of the fiber. As a result, the scaling-factor temperature coefficient is reduced. The temperature compensation apparatus may be in the form of a molded body element, or may be applied to the fiber as a coating.

CA-A-1,289,787 teaches a proposal for improving scale factor accuracy of an FOG in which an optical bandpass filter centered on the main wavelength of the light source is positioned within the light path upstream of the detector. The filter has a bandwidth that is narrower than the spectrum of the light beam emitted from the light source (SLD).

SUMMARY AND OBJECTS OF THE INVENTION

It is therefore the object of the present invention to provide a relatively-simple apparatus and method for improving scale factor stability in a fiber optic gyroscope.

The present invention addresses the preceding and other objects by providing, in a first aspect, a method for scale factor stabilization of a fiber optic gyroscope of the type in which the emission bandwidth of the intensity characteristic of a light source injected into a fiber end is limited by a narrowband optical filter to a considerably narrower transmission bandwidth. Such method comprises the step of readjusting the transmission bandwidth of the optical filter as a function of the measured temperature at the filter.

In another aspect, the invention provides an improvement in a fiber optic gyroscope of the type that includes an optical filter arrangement in the light path for limiting the bandwidth of the light carried in the fiber. The passband characteristic of the optical filter arrangement is matched to the wavelength band of the gyroscope. The improvement provided by the invention includes a temperature measurement device for measuring the instantaneous temperature of the optical filter arrangement and a device for correcting the measured temperature value. Such device employs a calibrated, stored temperature wavelength table that supplies a corrected value for calculating the scale factor via the gyroscope electronics.

The preceding and other features of the invention will become further apparent from the detailed description that follows. Such description is accompanied by a set of drawing figures. Numerals of the drawing figures, corresponding to those of the written description, point to the various features of the invention with like numerals referring to like features throughout the written description and the drawing figures.

DETAILED DESCRIPTION OF THE PREFERRED EMBODIMENT

As mentioned above, SLDs employed in FOGs possess comparatively wide emission bandwidths (e.g., more than 12 nm). For broadband lasers as a light source, the bandwidth magnitude can be assumed to be on the order of 8 to 10 nm. One of the major known causes of scale factor deterioration over time is that aging influences and instantaneous operating temperature fluctuations of the SLD exert considerable influence on scale factor fluctuations.

In accordance with the invention, a transmission arrangement in the form of a narrowband optical filter is introduced into the optical path, particularly that of the light from the SLD to a first beamsplitter and/or upstream of the detector, by means of which light source fluctuations can be completely (or at least largely) compensated. Drift in the band-limiting optical element is largely overcome by providing a dielectric optical filter whose characteristics are known and can be modelled as a function of temperature. The instantaneous temperature of the optical filter is (also) measured and the filter values are corrected by means of a pre-calibrated look-up table before the wavelength value is used for scale factor calculations.

Figure 1:
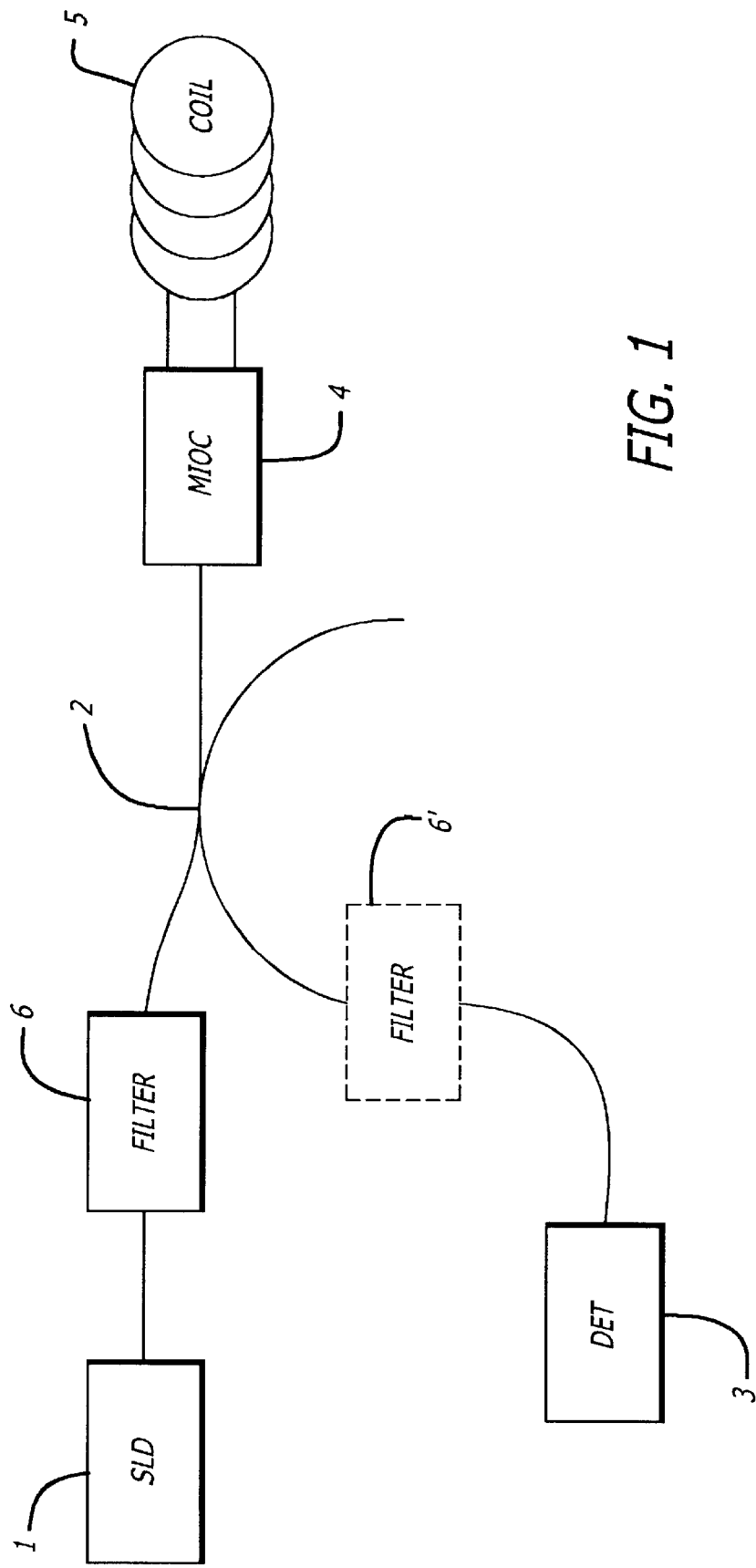
FIG. 1 is a basic schematic diagram of a fiber optic gyroscope including a filter arrangement in accordance with the invention.

FIG. 1 is a basic schematic diagram of a fiber optic gyroscope including a filter arrangement in accordance with the invention. As can be seen from the figure, it includes an SLD 1, a beamsplitter 2, an integrated optical chip MIOC 4, a fiber coil 5 and a detector 3 which detects interference images. An optical filter 6 (alternatively or additionally 6') in accordance with the invention, which can be modelled and limits the emission bandwidth of the SLD to a narrow passband curve, is inserted between the SLD 1 an the beamsplitter 2. As an alternative, it may be inserted, as shown at 6', in the rearward direction between the beamsplitter and the detector 3. The filter 6 (6') is installed in the transmission position.

Figure 2:
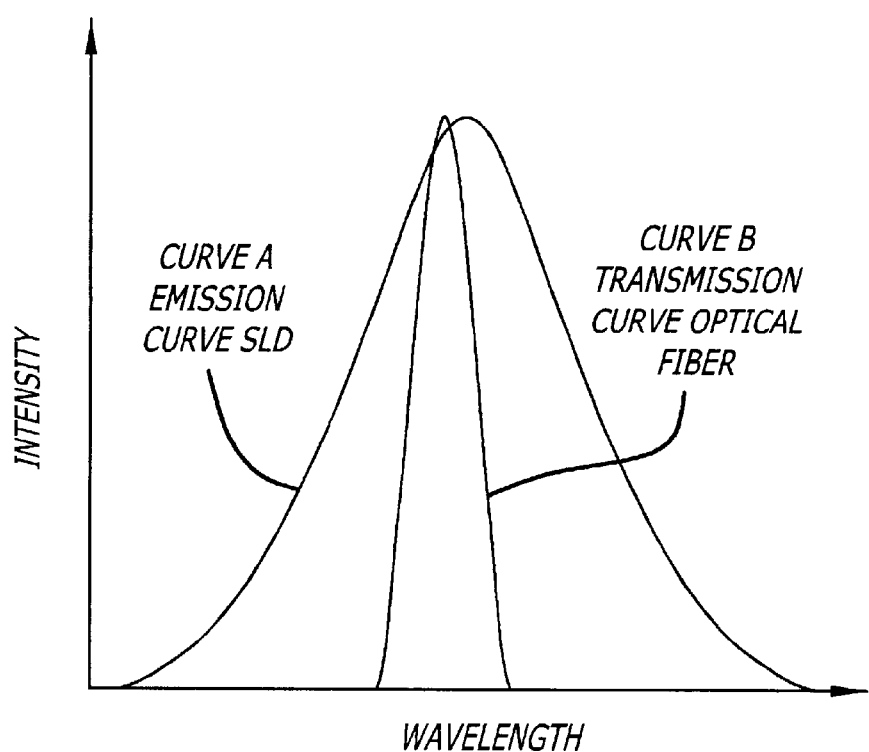
FIG. 2 illustrates graphs of the optical emission profile of an SLD and the emission profile of an optical filter in accordance with the invention.

FIG. 2 shows the qualitative relationship between the emission curve or bandwidth of the SLD 1 (Curve A) and the transmission curve or transmission bandwidth of the optical filter 6 (6') (Curve B). The shaded area beneath Curve B represents the total optical transmission from the light source via the filter 6 (6'). Should the Curve A (i.e., the emission curve of the light wavelength) be shifted (to the right or left) due to temperature or aging influences, the slightly changed transmission Curve B will remain at a predetermined calibration value and thus define the main portion of transmitted optical intensity.

Figure 3:
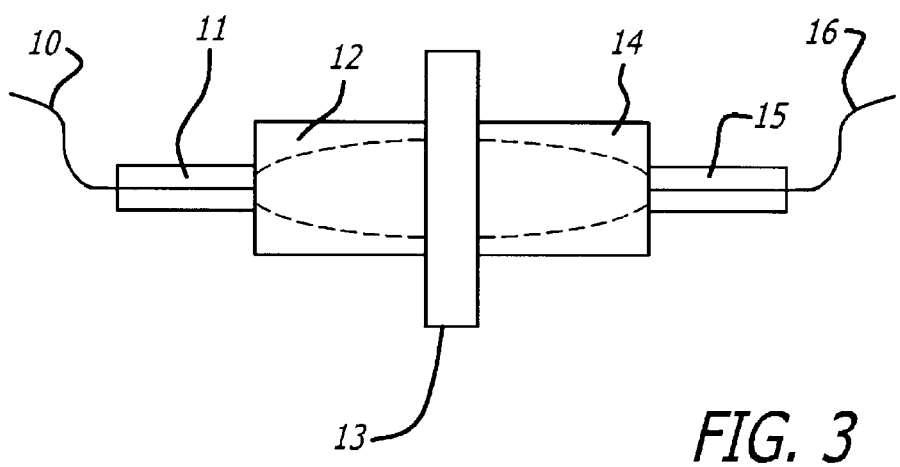
FIG. 3 is a side elevation view of an optical filter in accordance with the invention.

To achieve further improvement, the temperature at the filter 6 (6') should be measured. To achieve this, the optical filter 6 (6') is brought into close contact with a temperature-sensing element. The measured temperature value can then be corrected by means of a calibrated temperature wavelength table, and further processed by means of appropriate "catching algorithms" in the gyro electronics. This may be illustrated as follows: should the current through the SLD be continuously increased (e.g., on the basis of the temperature measurement normally provided), then the intensity will increase sharply such that the SLD is operated in the region of the optically most favorable passband. A further current increase, often minor, will result in a sharp drop in optical power. This effect is employed in a electronic control loop to stabilize wavelength with the wavelength drift that needs to be considered being primarily dependent upon the temperature of the optical filter. As mentioned, this temperature-wavelength dependency is also taken into account electronically, by means of a look-up table, to provide a high-precision calculation of the corresponding scale factor. If the filter is additionally hermetically-sealed and appropriately optically bonded, then wandering of the filtering passband curve as well as aging affects can be largely prevented. A technical implementation of an optical filter in accordance with the invention is illustrated in FIG. 3. A free end of an optical input fiber 10 is bonded into a fiber mounting 11. A first refractive index gradient lens 12 is adjacent the fiber mounting 11. The lens 12 may be of the type that is commonly available under the trademark "SELFOC". The opening of the optical path is shown by dashed lines.

A mirror-image arrangement comprises an optical output fiber 16, one of whose free ends is bonded to a fiber mounting 15 with an additional refractive index gradient lens 14 adjacent thereto. An optical interference filter 13, formed by a dielectric coating on a suitable glass body, is inserted between the two aligned lenses 12 and 14.

Use of the filter arrangement according to the invention provides a considerable improvement in scale factor stability for high-quality fiber optic gyroscopes. The invention limits the effects of temperature drift and gyro aging. It is particularly advantageous that, as soon as the gyro electronics have been switched on, a valid stabilization value of the operating wavelengths of the FOG is available for scale factor regulation. This is of critical importance for some applications, particularly in missile technology. Such rapid scale factor stabilization, even after the missile has been stored for a long time, cannot be achieved by known measures. An arrangement and device according to the invention is easy to produce.

While this invention has been described with reference to its presently-preferred embodiment, it is not limited thereto. Rather, the invention is limited only insofar as it is described by the following set of patent claims and includes within its scope all equivalents thereof.

What is claimed is:

1. A method for scale factor stabilization of a fiber optic gyroscope of the type in which the emission bandwidth of the intensity characteristic of a light source injected into a fiber end is limited by a narrowband optical filter to a considerably narrower transmission bandwidth, said method comprising the step of readjusting the transmission bandwidth of the optical filter as a function of the measured temperature at said filter.

2. A method as defined in claim 1 further comprising the steps of:
   a) measuring the intensity characteristic of the instantaneous light wavelength with respect to the temperature; and
   b) employing said intensity characteristic for active electronic readjustment of the transmission bandwidth of said optical filter.

3. A method as defined in claim 2 additionally comprising the step of carrying out the temperature-dependent correction of transmission bandwidth of said optical filter to wavelength values employed for scale factor calculation on the basis of said measured filter temperature with pre-calibrated stored values.

4. In a fiber optic gyroscope of the type that includes an optical filter arrangement in the light path whose passband characteristic is matched to the wavelength band of the gyroscope light source for limiting the bandwidth of the light carried in the fiber, the improvement comprising, in combination:
   a) measuring the instantaneous temperature of said optical filter arrangement; and
   b) a device for correcting said measured temperature value using a calibrated, stored temperature wavelength table for supplying a corrected value for calculating the scale factor via gyroscope electronics.

5. Apparatus as defined in claim 4 wherein said filter arrangement is arranged in said light path upstream of a first beamsplitter.

6. Apparatus as defined in claim 4 or 5, characterized in that the filter arrangement and/or an additional filter arrangement are arranged in the light path from the first beamsplitter to an electro-optical detector.

7. Apparatus as defined in claim 4 wherein said filter element within said filter arrangement comprises a dielectric optical filter.

8. Apparatus as defined in claim 4 or 7, further including:
   a) said filter element within said filter arrangement comprising an optical interference filter; and
   b) said filter element comprises a dielectric coating applied on a glass body.

9. Apparatus as defined in claim 8 wherein said filter arrangement comprises:
   a) a first refractive index gradient lens coupled to an input fiber;
   b) a second refractive index gradient lens coupled to an output fiber; and
   c) said interference filter is located between said refractive index gradient lenses.

10. Apparatus as defined in claim 5 wherein the dielectric characteristics of said optical filter arrangement comprise a function of the temperature measured at the filter.

11. Apparatus as defined in claim 9 further including:
a) said filter arrangement is formed from optically bonded elements; and
b) said arrangement is hermetically sealed.

12. Apparatus as defined in claim 11 further including a temperature sensor integrated into said filter arrangement.

* * * * *